United States Patent [19]

Pleus

[11] 4,190,678
[45] Feb. 26, 1980

[54] METHOD AND APPARATUS FOR DEWATERING VEGETABLES AND THE LIKE

[75] Inventor: Edwin F. Pleus, Sun Prairie, Wis.

[73] Assignee: Aunt Nellie's Foods, Inc., Clyman, Wis.

[21] Appl. No.: 934,893

[22] Filed: Aug. 18, 1978

Related U.S. Application Data

[63] Continuation of Ser. No. 683,028, May 4, 1976, abandoned.

[51] Int. Cl.² .......................... A23N 1/00; B07B 1/30
[52] U.S. Cl. ..................................... 426/478; 210/19; 210/73 P; 210/74; 210/77; 210/251; 210/297; 210/314; 99/646 R; 209/44.1; 209/234; 209/250
[58] Field of Search ................. 210/19, 65, 73 R, 74, 210/77, 251, 297, 314, 388; 209/17, 234, 250, 269, 352, 365 R, 414, 417, 418, 419, 44.1, 703; 99/495, 496, 646 R; 426/288, 478, 495

[56] References Cited

U.S. PATENT DOCUMENTS

| | | | |
|---|---|---|---|
| 695,552 | 3/1902 | Wilkinson | 209/414 |
| 723,073 | 3/1903 | Tibbetts | 209/414 |
| 968,242 | 8/1910 | Inman | 209/17 |
| 1,803,112 | 4/1931 | Helfenbein | 209/352 |
| 2,158,169 | 5/1939 | Wright | 210/73 R |
| 2,560,429 | 7/1951 | France | 209/250 |
| 2,585,719 | 2/1952 | Alvord | 209/250 |
| 3,058,591 | 10/1962 | Nakahara | 209/250 |
| 3,206,396 | 9/1965 | Davis | 210/77 |
| 3,430,764 | 3/1969 | Hensley | 209/10 |
| 3,507,387 | 4/1970 | Alldred, Jr. et al. | 209/45 |
| 3,813,298 | 5/1974 | Chulek | 209/234 |
| 3,835,999 | 9/1974 | Moore | 209/251 |

FOREIGN PATENT DOCUMENTS 617969  8/1935  Fed. Rep. of Germany ........... 210/388

*Primary Examiner*—David L. Lacey
*Attorney, Agent, or Firm*—Michael, Best & Friedrich

[57] ABSTRACT

A frame structure having a pre-dewatering unit fixedly mounted thereon and a final-dewatering and inspection table unit movably mounted thereon. The pre-dewatering unit includes a vertically extending receiving compartment through which the mixture of water and vegetables passes upwardly from bottom to top and a pre-dewatering chute adapted to receive the mixture flowing over the top of the receiving chamber. The pre-dewatering chute includes an upper chamber and a lower chamber separated by a screen member. The screen member is positioned at an angle to the horizontal so that the solid material in the mixture will pass over the top surface of the screen member and a substantial portion of the liquid material will pass through the screen member into the lower chamber. The final-dewatering and inspection table unit includes a final-dewatering section and an inspection table section, both of which are vibrated by a suitable vibratory means. The final-dewatering section includes a screen member over which the material flowing from the pre-dewatering chute passes with the solid material passing over the top surface of the screen so that a final portion of the liquid in the mixture will pass through the screen. The inspection table section is positioned to receive the dewatered material passing from the final-dewatering section with the material passing through the section due to the vibration thereof.

9 Claims, 5 Drawing Figures

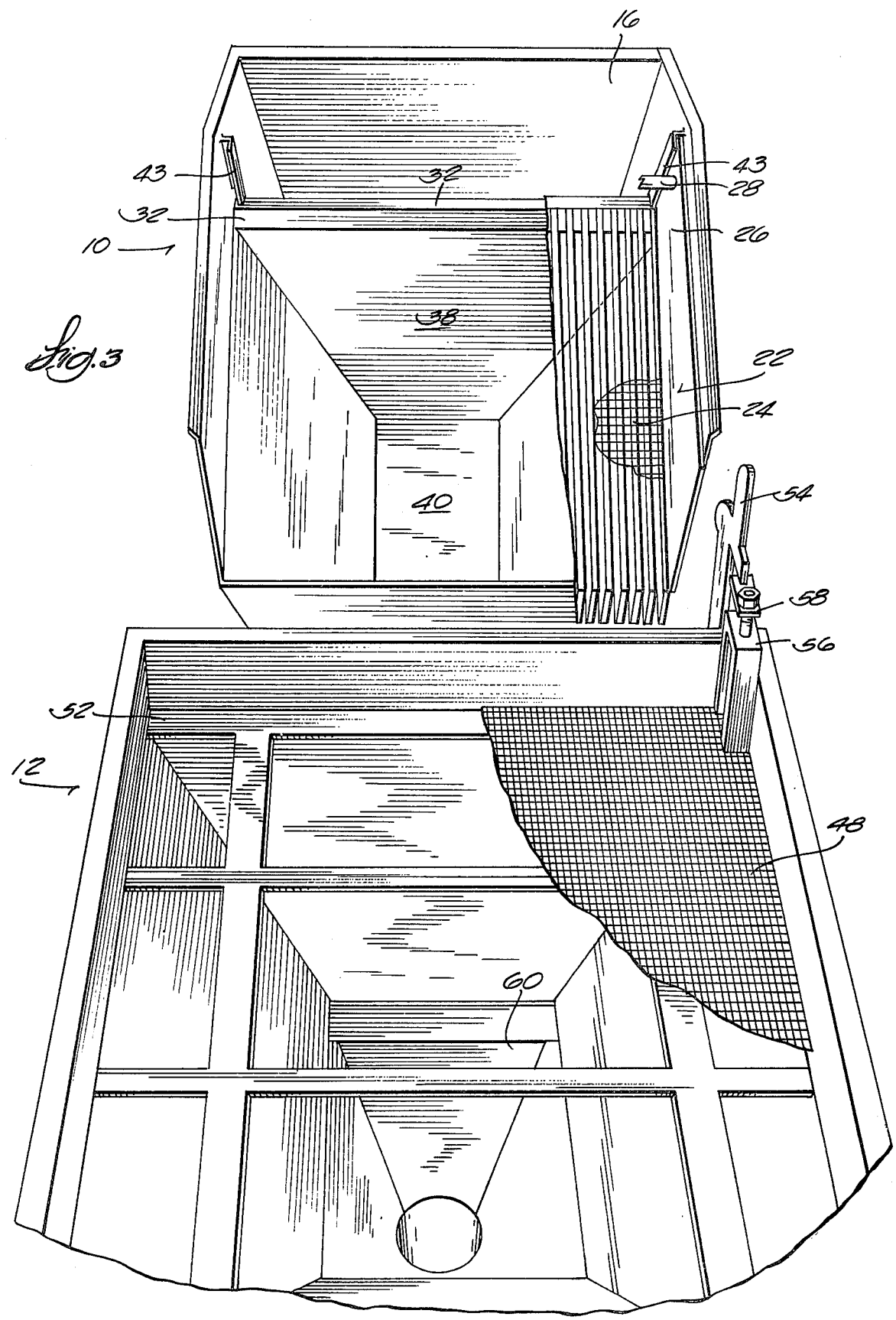

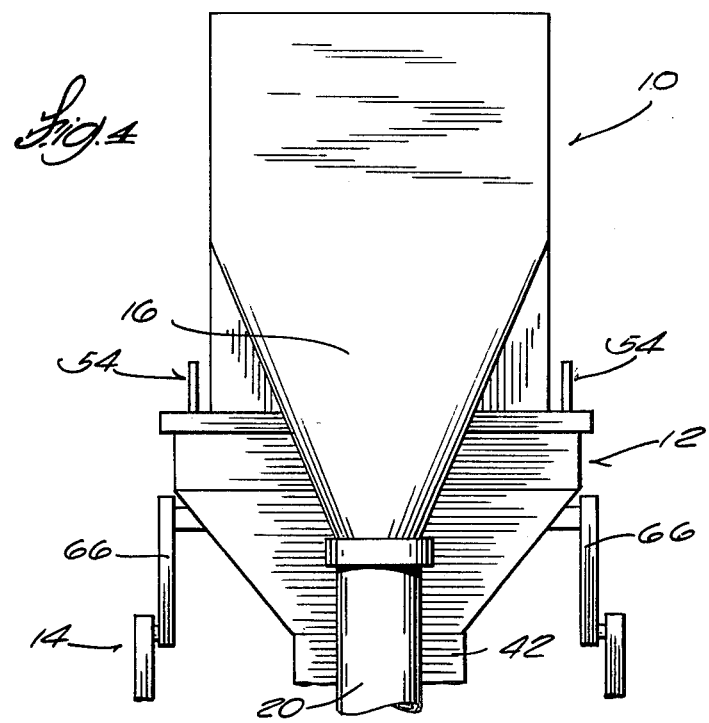
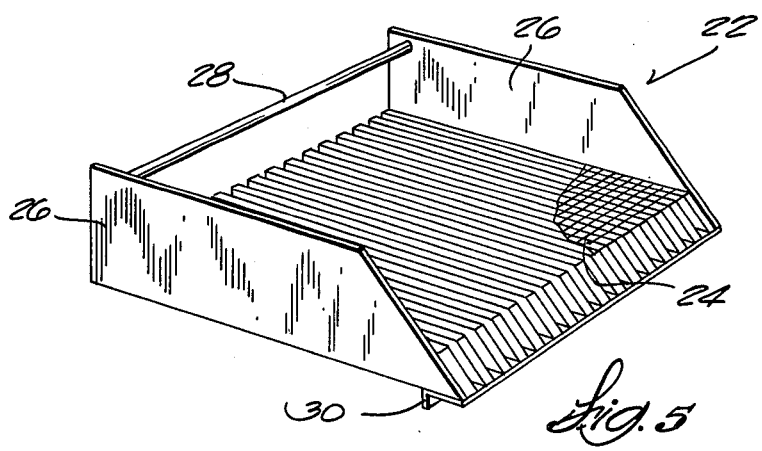

4,190,678

METHOD AND APPARATUS FOR DEWATERING VEGETABLES AND THE LIKE

CROSS REFERENCES TO RELATED APPLICATIONS

This is a continuation of application Ser. No. 683,028 filed May 4, 1976, now abandoned.

BACKGROUND OF THE INVENTION

I. Field of the Invention

This invention relates to a method and apparatus for dewatering a liquid vegetable mixture.

II. Description of the Prior Art

Prior methods and apparatus for dewatering vegetables involve the use of relatively complex mechanisms which involve sanitation problems in that they were relatively difficult to keep clean. The principal object of the present invention is to provide a relatively simple apparatus which due to its simplicity can be readily cleaned to maintain the very strict sanitary standards required for this type of use. In the present invention a substantial portion of the water in the water vegetable mixture is removed in a pre-dewatering unit which requires no moving parts and can be readily disassembled for inspection and cleaning. In prior apparatus known to applicant such initial dewatering was performed by a more complex apparatus including electric motors, moving parts, etc. which was not only more expensive to manufacture and maintain but was more difficult to keep clean.

SUMMARY OF THE INVENTION

A combination dewatering and inspection apparatus comprising a pre-dewatering unit adapted to receive a mixture of liquid and solid material at the inlet and further adapted to remove a substantial portion of the liquid from the mixture as it passes therethrough. The pre-dewatering unit includes a vertically extending receiving compartment and a pre-dewatering chute adapted to receive the mixture flowing from the top of the receiving compartment, which chute includes an upper chamber and a lower chamber separated by a screen member removably mounted therein. A final-dewatering and inspection table unit is mounted adjacent the pre-dewatering unit and includes a final-dewatering screen over which the material passes to remove a final portion of the liquid from the mixture. Adjacent the screen is an inspection table section over which the solid material passes. Both the dewatering screen and the section table are movably mounted on a fixed frame and subjected to a vibratory movement by suitable vibrator means.

DESCRIPTION OF THE DRAWINGS

FIG. 3 is a fragmentary perspective top view of the apparatus shown in FIG. 1 (with parts broken away);

FIG. 4 is an end elevation view of the apparatus shown in FIG. 1, and

FIG. 5 is a perspective view of the removable screen member used in the pre-dewatering unit of the apparatus.

DESCRIPTION OF THE PREFERRED EMBODIMENT

Figure 1:
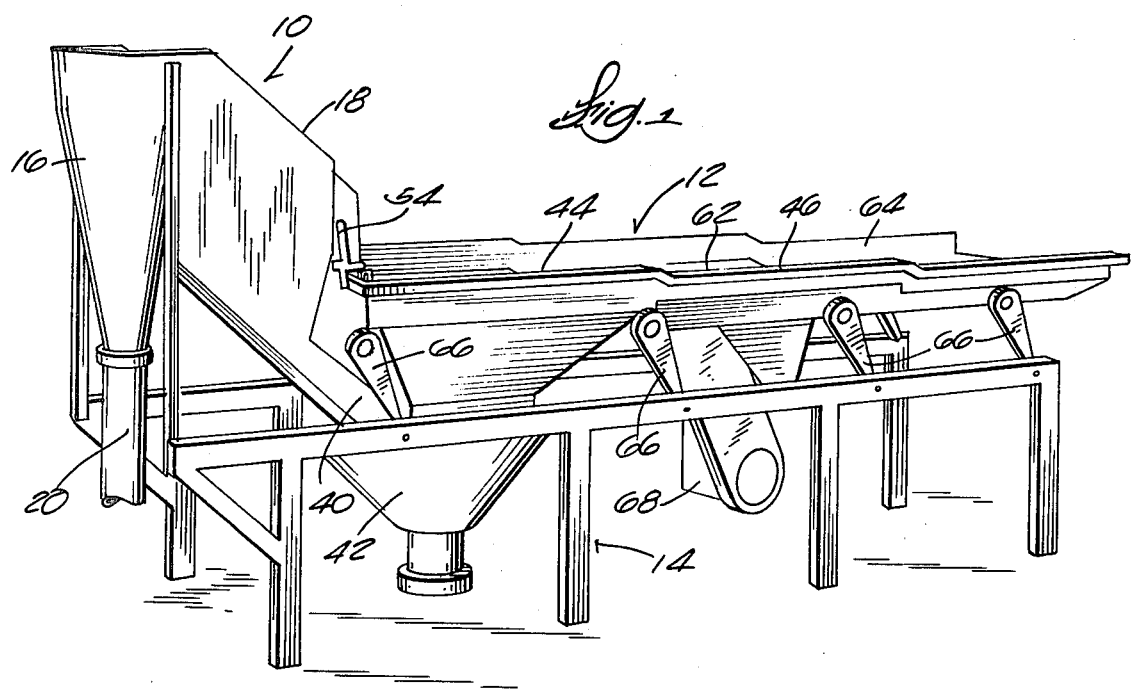
FIG. 1 is a perspective side view of the combination dewatering and inspection apparatus of the present invention.

Referring to the drawings in detail, the apparatus of the present invention is comprised of two basic units, namely, a stationary pre-dewatering unit 10 and a vibrating combination final-dewatering and inspection table unit 12. As best shown in FIG. 1, units 10 and 12 are mounted on a common frame structure 14.

Pre-dewatering unit 10 is comprised of a vertically extending receiving compartment 16, operatively connected to a downwardly angling pre-dewatering chute 18. The bottom end of compartment 16 is adapted for fluid connection to an inlet pipe 20. As best shown in FIG. 4, inlet compartment 16 tapers outwardly and upwardly from the bottom portion to the upper portion thereof for reasons to be explained hereinafter.

Figure 2:
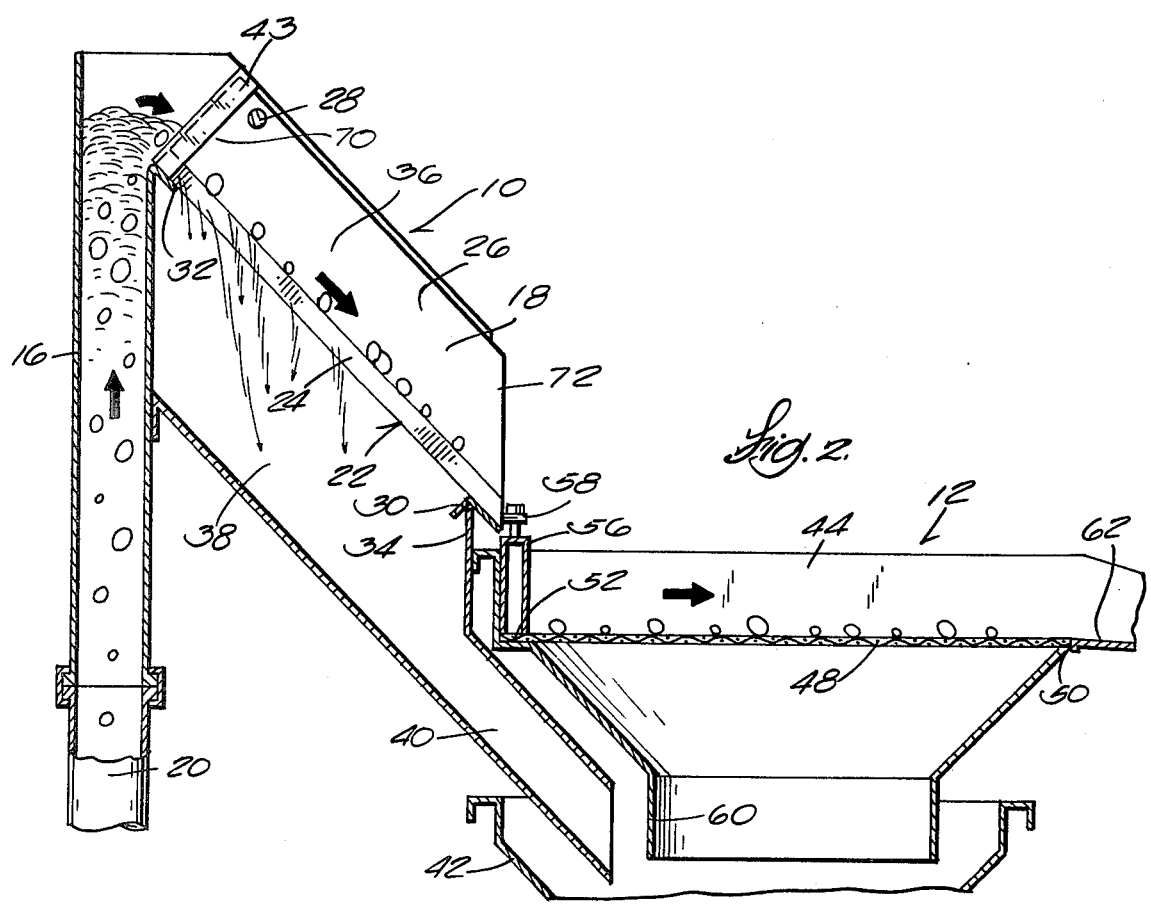
FIG. 2 is a fragmentary vertical sectional view of the apparatus shown in FIG. 1.

Pre-dewatering chute 18 has a removable screen member 22 mounted therein as best shown in FIG. 2. As shown in FIG. 5, screen member 22 is comprised of perforated bottom portion 24, sidewalls 26,26 and a rod member 28 fastened between the sidewalls for handling and reinforcement purposes. A transversely extending support lip 30 is fastened to the underside of bottom portion 24.

When the screen member 22 is in operative position (FIG. 2), the upper edge of the bottom portion of screen 22 is supported on a transverse lip 32 located at the top of inlet compartment 16 with the support lip 30 positioned behind and against the upper edge of the vertical wall 34 at the front of chute 18. When so positioned, screen member 22 divides chute 18 into an upper chamber 36 through which the solid material passes and a lower chamber 38 through which the liquid passes. The liquid drains from chamber 38 through an outlet spout 40 into a collector 42. A pair of sealing flanges 43,43 are mounted at the top portion of compartment 16 (FIG. 3) behind which the rear edges of sidewalls 26 of member 22 extend when the member is in operative position.

The combination final-dewatering and inspection table unit 12 is comprised of a final-dewatering section 44 and an inspection section 46.

Final-dewatering section 44 has a removable perforated screen member 48 mounted therein over which the solid material passes immediately upon its discharge from chute 18. Screen member 48 is supported in section 44 on horizontal support surfaces 50 and 52 and is held securely in operative position by a pair of pivotally mounted clamp members 54,54 which clamp against a pair of vertical channel members 56,56 fastened to the top surface of screen member 48. The clamping force can be adjusted by means of a pair of vertically adjustable abutment members 58,58 mounted on the top of each channel member 56. Final-dewatering section 44 has an opening 60 in the bottom portion thereof to permit drainage of liquid from section 44 into collector 42. Inspection table section 46 is in the form of an elongated table having an imperforate bottom 62 and sides 64.

The entire combination final-dewatering and inspection table unit 12 is mounted for vibratory movement on frame 14 by means of a plurality of movable support arms 66. A vibratory action is imparted to unit 12 by means of a motor driven vibrating drive unit 68 of conventional design.

OPERATION

While the apparatus of the present invention may be used to process a variety of different products, it is particularly designed to process various types of vegetables. As one typical example of use, the apparatus shown in the drawings is being operated to process cooked and peeled whole beets.

The peeled beet and water mixture is pumped to the apparatus by any suitable pumping means (not shown). The mixture enters the apparatus through inlet pipe 20 and flows upwardly therefrom through inlet compartment 16. It will be noted (FIG. 4) that the width of compartment 16 tapers outwardly from bottom to top so that the mixture flowing from inlet pipe 20 will flow into a compartment of a gradually increasing volumetric size to thereby create a substantial reduction in the flow velocity as the mixture flows upwardly inside compartment 16.

When the mixture reaches the top portion of compartment 16, it cascades over the top edge of the compartment (in the area indicated by reference numeral 70) like a waterfall into the upper chamber 36 of chute 18 as shown by the arrows in FIG. 2.

As the mixture flows downwardly through chute 18, a substantial portion (about 90%) of the water passes through the screen member 22 and flows out to collector 42 through lower chamber 38 and outlet spout 40. The beets in the mixture pass through the upper chamber 36 along the top surface of screen 22 to the chute outlet 72 by gravity.

The beets (and water) passing from chute 18 are deposited on the screen 48 of the final-dewatering section 44 of table unit 12. As the beets pass over the surface of screen 48, the remaining water in the mixture will pass through the screen and out through opening 60 into reservoir 42.

The fully dewatered beets then continue to travel through the inspection table section 46 during which time any damaged, undersize or otherwise unacceptable material is removed manually by the inspectors. The movement of the beets through table unit 12 in the desired direction is produced by the vibratory movement of the table which in turn is imparted thereto by the operation of drive unit 68 and support arms 66 of conventional design. The inspected and dewatered beets are collected at the outlet end of table 46 for further processing by any suitable means (not shown).

It will be appreciated from the foregoing that the apparatus of the present invention is of relatively simple design. More particularly it is noted that the pre-dewatering unit 10 is a stationary device requiring no moving parts, motor drives, etc. as was the case in prior constructions.

It should also be noted that the apparatus can be thoroughly cleaned on a periodic basis by following a relatively simple procedure. To clean the pre-dewatering unit 10 the screen unit 22 is removed from the unit by simply gripping the rod member 28 and pulling forwardly and upwardly to allow it to become disengaged from the chute. The screen member 22 can then be cleaned conveniently and the remaining portion of the unit 10, namely the lower chamber 38 and spout 40 can be cleaned manually by a cleaning brush or similar means which can be readily inserted into the exposed surfaces from above. As indicated, this can be done quickly conveniently and a thorough cleaning job will result.

Similarly, the final-dewatering portion 44 of the apparatus can be cleaned by first removing screen 48 which upon its removal will expose all the portions there below which can be easily cleaned manually with a brush inserted from above. Screen 48 is removed simply by disengaging the clamp members 54 from their closed position which upon disengagement allows the screen 48 to be pulled upwardly from its operating position by gripping channel members 56.

I claim:

1. A method of dewatering and inspecting a water-vegetable mixture comprising the steps of:
    (a) forcing a water-vegetable mixture into the bottom portion of a vertical compartment having an open top to cause the mixture to flow upwardly in the compartment and out over a top edge of the compartment;
    (b) removing a substantial portion of the water in the mixture by causing the mixture to flow downwardly from the open top of the vertical compartment over a screen member, said screen member positioned at an angle to the horizontal;
    (c) removing a final portion of the water from the mixture by depositing the mixture on a vibrating screen member; and
    (d) inspecting the dewatered vegetables by passing the dewatered vegetables over a vibrating inspection table.

2. A method of dewatering and inspecting a water-vegetable mixture according to claim 1 in which the velocity of flow of the mixture through the vertical compartment is reduced from inlet to outlet by utilizing a compartment having a cross sectional area which gradually increases from its bottom inlet to its top outlet.

3. A method of dewatering and inspecting a water-vegetable mixture according to claim 2 in which the water removed during steps (b) and (c) is delivered to a common collector from which it is then recirculated into said vertical compartment.

4. A combination dewatering and inspection apparatus comprising:
    a frame structure;
    a pre-dewatering unit fixedly mounted on said frame structure, said pre-dewatering unit including a vertically extending receiving compartment having an inlet in the lower portion thereof and an open top having a top edge, said receiving compartment adapted to receive a mixture of liquid and solid material at the inlet thereof for flow upwardly therethrough to the open top thereof and then out of the open top over said top edge of the compartment, said pre-dewatering unit further including a pre-dewatering chute located adjacent said top edge of said open top of said receiving chamber and adapted to receive the mixture flowing from the open top of said receiving chamber, said pre-dewatering chute including an upper chamber and a lower chamber separated by a screen member mounted in said pre-dewatering chute, said screen member being inclined downwardly from its receiving end and positioned so that the solid material in the mixture will pass over the top surface of the screen member and a substantial portion of the liquid material will pass through said screen member into said lower chamber; and
    a final-dewatering and inspection table unit mounted adjacent said pre-dewatering unit, said final-dewatering and inspection table unit including a final-dewatering section movably mounted on said frame structure and a horizontal impervious inspection table section movably mounted on said frame structure, said final-dewatering and inspection table unit further including a vibratory means mounted on said frame structure for imparting a vibratory movement to said final-dewatering and inspection table sections, said final-dewatering section including a horizontal screen member mounted therein and positioned adjacent the lower end of said inclined screen member mounted in said pre-dewatering chute to receive the mixture flowing from said pre-dewatering chute of said pre-dewatering unit with the solid material in the mixture passing over the top surface of said horizontal screen member due to the vibration thereof and with a final portion of the water in the mixture passing through said horizontal screen member, said impervious inspection table section positioned adjacent said final-dewatering section to receive the dewatered material passing from said final dewatering section with said dewatered material passing through said inspection table section due to the vibration thereof.

5. The combination dewatering and inspection apparatus according to claim 4, in which the cross sectional area of said receiving compartment increases from its inlet to its open top so that the velocity of flow therethrough will decrease as the mixture flows from the inlet to the open top thereof.

6. The combination dewatering and inspection apparatus according to claim 4, in which said screen member in said pre-dewatering chute is removably mounted therein, said pre-dewatering screen member comprising a perforated bottom portion having a transversely extending support lip fastened to the underside thereof for engagement with one edge of said chute when said pre-dewatering screen member is in operative position.

7. The combination dewatering and inspection apparatus according to claim 6, in which said pre-dewatering screen member has a pair of sidewalls fastened to said perforated bottom portion and a rod member fastened between said sidewalls to facilitate removal and installation of said pre-dewatering screen member in said chute.

8. The combination dewatering and inspection apparatus according to claim 4, in which said screen member of said final-dewatering section is removably mounted therein, said final-dewatering section having a pair of movable clamp members mounted thereon adapted when in closed position to securely hold said final-dewatering screen member in operative position and adapted when in open position to permit removal of said final-dewatering screen member from said final-dewatering section.

9. The combination dewatering and inspection apparatus according to claim 4, in which there is a stationary liquid collector mounted beneath said final-dewatering section of said final-dewatering and inspection table unit into which liquid passes after it has passed through said final-dewatering screen, said pre-dewatering chute having a spout connected to the lower chamber thereof and positioned with its outlet end above said liquid collector to carry liquid from said lower chamber into said liquid collector.

* * * * *